(12) United States Patent
Kim

(10) Patent No.: US 7,283,835 B2
(45) Date of Patent: Oct. 16, 2007

(54) METHOD OF PROVIDING EXTENDED GROUP CALL SERVICE

(75) Inventor: Hoe-Won Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 544 days.

(21) Appl. No.: 10/772,513

(22) Filed: Feb. 5, 2004

(65) Prior Publication Data

US 2004/0180682 A1    Sep. 16, 2004

(30) Foreign Application Priority Data

Feb. 6, 2003    (KR)    ............. 10-2003-0007501

(51) Int. Cl.
*H04B 7/00* (2006.01)
*H04Q 7/20* (2006.01)
(52) U.S. Cl. ............... 455/518; 455/519; 455/520; 455/325; 455/62
(58) Field of Classification Search ........ 455/518–520, 455/525, 436, 437, 62; 370/341, 329
See application file for complete search history.

(56) References Cited

U.S. PATENT DOCUMENTS

| | | | |
|---|---|---|---|
| 5,457,809 A * | 10/1995 | Ohnishi | ............... 455/518 |
| 5,465,391 A | 11/1995 | Toyryla | |
| 5,506,837 A * | 4/1996 | Sollner et al. | ............... 370/296 |
| 5,970,417 A | 10/1999 | Toyryla et al. | |
| 6,169,906 B1 * | 1/2001 | Bruckert | ............... 455/518 |
| 6,377,560 B1 * | 4/2002 | Dailey | ............... 370/329 |
| 6,516,200 B1 * | 2/2003 | Schmidt et al. | ............... 455/518 |
| 6,545,995 B1 * | 4/2003 | Kinnunen et al. | ............... 370/341 |
| 6,922,547 B2 * | 7/2005 | O'Neill et al. | ............... 455/17 |

FOREIGN PATENT DOCUMENTS

WO    WO 01/47293    6/2001

* cited by examiner

*Primary Examiner*—Matthew D. Anderson
*Assistant Examiner*—Sujatha Sharma
(74) *Attorney, Agent, or Firm*—The Farrell Law Firm, P.C.

(57) ABSTRACT

A method of providing a group call service in a radio network is provided. A BS, which does not cover a GCA but is located in a radio network near to the GCA, generates extended group call service information including information about BSs that cover an NGCA and broadcasts the extended group call service information. Upon receipt of the extended group call service information, an MS selects a BS in the best service condition among BSs set in the extended group call service information as a BS from which to receive an extended group call service and receives group call paging information from the BS. The MS analyzes the group call paging information and decides whether the group call service is available from the BS. If the group call service is available, the MS registers and connects to the selected BS and receives the group call from the BS.

10 Claims, 3 Drawing Sheets

METHOD OF PROVIDING EXTENDED GROUP CALL SERVICE

PRIORITY

This application claims priority under 35 U.S.C. § 119 to an application entitled "Method of Providing Extended Group Call Service" filed in the Korean Intellectual Property Office on Feb. 6, 2003 and assigned Serial No. 2003-7501, the contents of which are incorporated herein by reference.

BACKGROUND OF THE INVENTION

1. Field of the Invention

The present invention relates generally to a method of providing a group call service, and in particular, to a method of providing an extended group call service that allows a subscriber to a predetermined group call service to receive the group call service from a neighboring group call area if he is located out of a group call service area, in a radio network environment supporting group call service.

2. Description of the Related Art

In general, GSM (Global System for Mobile communication) supports group call service. A group call service refers to concurrent provisioning of the same information to a plurality of subscribers to the group call service via one channel. Besides a paging channel (PCH), a base station (BS) that services a group call broadcasts a group call channel (GCC) to mobile stations (MSs) within its service area.

FIG. 1 illustrates a typical group call service environment. A group call service-supporting BS BS1 is adjacent to a non-group call service-supporting BS BS2 in FIG. 1. Referring to FIG. 1, BS1 supports a group call service and its service area 10 is called a group call area (GCA). BS2 does not support the group call service and its service area 20 is called a Not_GCA.

FIG. 2 illustrates an example of information that a typical group call service-supporting BS broadcasts to MSs within its service area. In FIG. 2, reference numeral 30 denotes a general PCH, while reference numeral 40 denotes a GCC that provides basic information about the group call service.

Referring to FIG. 2, the general PCH30 includes BS_ID, the ID of a BS that has generated the PCH, and general paging information (e.g. the received signal strength of the BS and position information). The GCC40 includes BS_ID, the ID of a BS that has generated a notification channel (NCH), and group call paging information. The group call service-supporting BS broadcasts both the general PCH30 and the GCC40. Meanwhile, the non-group call service-supporting BS broadcasts only the general PCH30. Thus, subscribers to the group call service receive both the PCH30 and GCC40.

In the case illustrated in FIG. 1, BS1 broadcasts both the general PCH30 and GCC40 as illustrated in FIG. 2 because it provides the group call service. On the other hand, BS2, which does not provide the group call service, broadcasts only the general PCH30. Therefore, MS1 within the GCA 10 receives both the general PCH30 and GCC40, whereas MS2 within the Not_GCA 20 receives only the general PCH30.

Meanwhile, MS3 is located in an overlap area between BS1 and BS2, so that it can receive information from both BS1 and BS2. MS3 compares the received signal strengths of PCHs from BS1 and BS2 and registers to a BS having the higher received signal strength. In the illustrated case of FIG. 1, MS3 receives higher signal strength from BS2 and so registers to BS2, thereby receiving a radio communication service from BS2. Thus, MS1 receives a radio communication service from BS1, while MS2 and MS3 receive radio communication services from BS2.

If MS3 is a subscriber to the group call service from BS1, it cannot receive the group call service due to its registration to BS2 even though it is positioned where data can be received from BS1.

Traditionally, even when a subscriber to a particular group call service is within the service area of a GCA of the group call service with received signal strength enough to stably receive the group call service, but the subscriber has registered to another BS that offers a higher received signal strength than a BS that provides the group call service, but not a GCA of the group service call service, and consequently, the subscriber cannot receive the group call service.

SUMMARY OF THE INVENTION

An object of the present invention is to substantially solve at least the above problems and/or disadvantages and to provide at least the advantages below. Accordingly, an object of the present invention is to provide a method of providing an extended group call service that enables a subscriber to a particular group call service to receive the group call service from a neighboring GCA if the subscriber is registered to a BS that does not provide but is within the GCA of the neighboring BS the group call service, in a radio network environment supporting group call service.

Another object of the present invention is to provide a method of providing an extended group call service in which a non-group call service-supporting BS provides MSs within its service area with group call service information from an adjacent BS supporting a group call service so that a subscriber out of the GCA of the group call service can receive the group call service from a neighboring GCA.

The above objects are achieved by a method of providing an extended group call service in a radio network. In the extended group call service method, a BS, which does not cover a GCA but is located in a radio network near to the GCA, generates extended group call service information including information about BSs that cover an NGCA and broadcasts the extended group call service information. Upon receipt of the extended group call service information, an MS selects a BS in the best service condition among BSs set in the extended group call service information as a BS from which to receive an extended group call service and receives group call paging information from the BS. The MS analyzes the group call paging information and decides whether the group call service is available from the BS. If the group call service is available, the MS registers and connects to the selected BS and receives the group call from the BS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
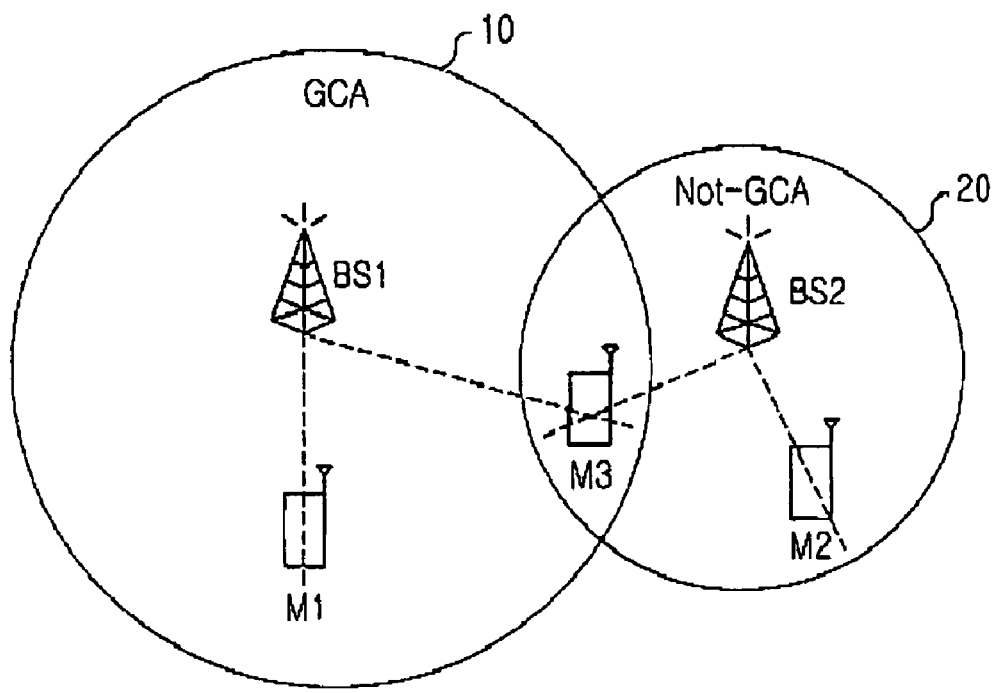
FIG. 1 illustrates a typical group call service environment.
Figure 2:
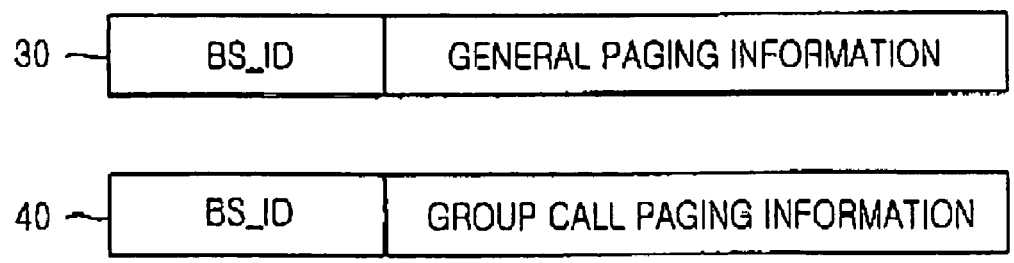
FIG. 2 illustrates an example of information that a typical group call service-supporting BS broadcasts to MSs within its service area.
Figure 3:
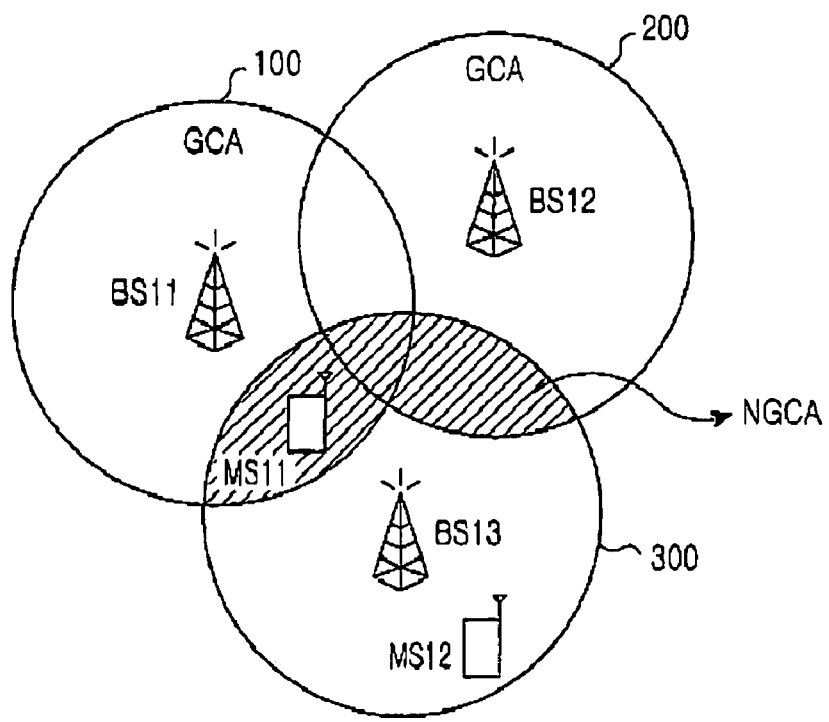
FIG. 3 illustrates an extended group call service environment according to an embodiment of the present invention.

FIG. 3 illustrates an extended group call service environment according to an embodiment of the present invention. Group call service-supporting BSs are adjacent to a non-group call service-supporting BS in FIG. 3. Referring to FIG. 3, BS11 and BS12 support a group call service, while BS13 does not. Therefore, the service areas 100 and 200 of BS11 and BS12 are GCAs. The service area 300 of BS13 is partially overlapped, shown by the shaded areas, with the GCAs 100 and 200, although it is not a full GCA. In other words, although the group call service is not directly available from BS11 and BS12 in the service area 300 of BS13, the GCAs 100 and 200 partially overlap with the area 300, as marked with the shaded area. This shaded area is defined as a neighboring group call area (NGCA).

In GSM, BSs generally share system information (e.g. BS ID, frequency information, availability of group call service, and group call ID) about other BSs that cover a predetermined number of (e.g. six) adjacent cells to each of their cells. This system information sharing allows a rapid handover for an MS that moves from one cell to another. The system information is usually called a BCCH (Broadcast Control Channel) allocation (BA) list.

In the case illustrated in FIG. 3, BS11, BS12 and BS13 share their system information (e.g. BS ID, frequency information, availability of group call service, and group call ID). Hence, MSs within the NGCA (marked with the shaded area) under the coverage of BS13 are capable of receiving a group call service from BS11 or BS12. The group call service provided by an adjacent BS instead of a serving BS is called "extended group call service".

To support the extended group call service, BS13 generates extended group call service information based on the BA list and broadcasts it to all MSs within its service area 300. That is, BS13 broadcasts general paging information on a general PCH and the extended group call service information on an NCH to the MSs. Like the PCH, the NCH is one of channels mapped to a BCCH.

Figure 4:
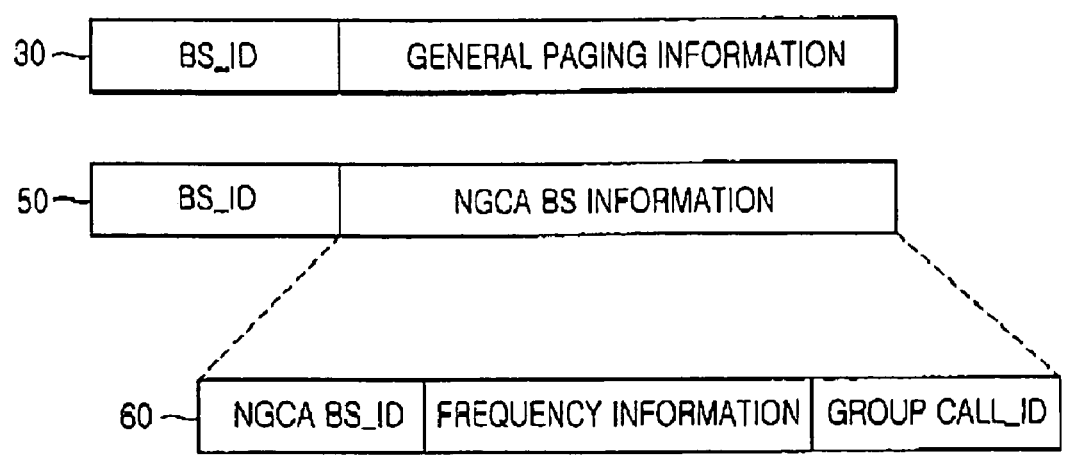
FIG. 4 illustrates an example of information that a typical BS supporting an extended group call service broadcasts to MSs within its service area according to the embodiment of the present invention.

FIG. 4 illustrates an example of information that a BS providing the extended group call service broadcasts to MSs within its service area according to the embodiment of the present invention. In the case illustrated in FIG. 3, BS13 broadcasts the information to all MSs within its service area 300.

Referring to FIG. 4, reference numeral 30 denotes the general PCH and reference numeral 50 denotes the extended group call service information. As described before, the general PCH30 provides BS_ID, the ID of a BS that has generated the PCH, and general paging information (e.g., the received signal strength of the BS and position information).

The extended group call service information 50 (or GCNGM: Group Call Notification Guiding Message) provides BS_ID, the ID of a BS that has generated the GCNGM, and NGCA BS Information, information about BSs that have an NGCA under their coverage.

NGCA BS Information includes NGCA BS_ID, the IDs of the BSs covering the NGCA, Frequency Information, and Group Call_ID, the ID of a group call, as indicated by reference numeral 60. NGCA BS_ID and Frequency Information must include sufficient information such that an MS which has received the GCNGM can decide whether it has been paged for the group call. It is preferable to refer to the BA list for NGCA BS_ID and Frequency Information. Meanwhile, Group Call_ID identifies the group call. Thus, the MS can decide by Group Call_ID whether the group call is from a group call service to which it has subscribed.

NGCA BS Information further includes additional information about the NGCA BSs in addition to NGCA BS_ID, Frequency Information, and Group Call_ID illustrated in FIG. 4.

In the case illustrated in FIG. 3, BS13 generates the GCNGM and broadcasts it to all MSs within its service area 300. The GCNGM includes information about BS11 and BS12. That is, BS13 sets BS_ID, Frequency Information and Group Call_ID of BS11 and BS_ID, Frequency Information and Group Call_ID of BS12 in the GCNGM and broadcasts the GCNGM to the MSs.

Thus, MSs in the NGCA under the coverage of BS13 can receive a group call service from a BS that covers an adjacent cell supporting the group call service according to the information set in the GCNGM.

Figure 5:
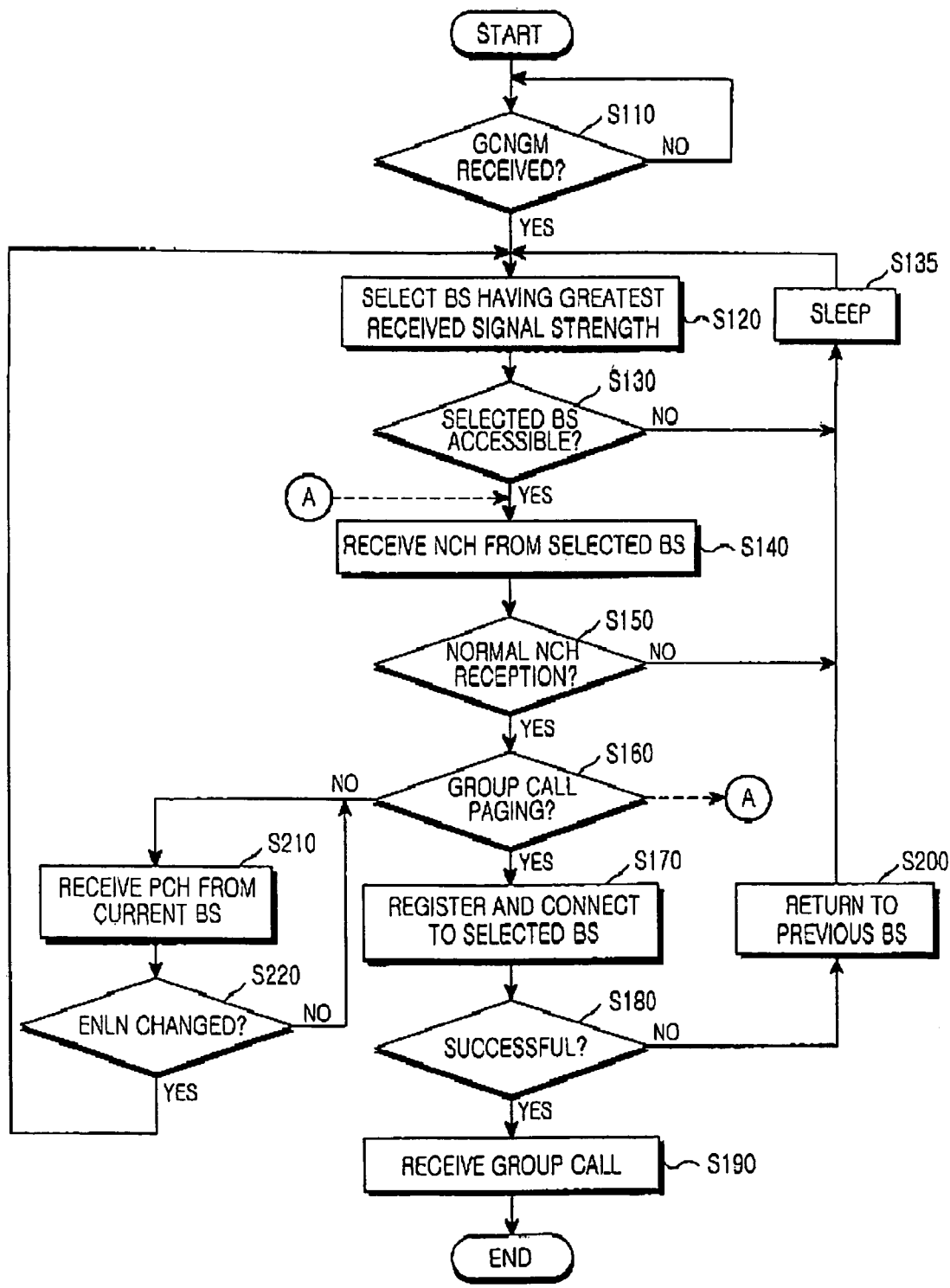
FIG. 5 is a flowchart illustrating an operation for receiving an extended group call service in an MS that has received information about the extended group call service according to the embodiment of the present invention.

An operation for receiving a group call service from the BS of an adjacent cell supporting the group call service in an MS that has received the GCNGM is illustrated in FIG. 5.

FIG. 5 is a flowchart illustrating an operation for receiving a group call service in an MS upon receipt of the GCNGM according to the embodiment of the present invention.

Referring to FIGS. 3, 4 and 5, upon receipt of the GCNGM in step S110, an MS in the service area 300 of BS13 selects a BS having the greatest received signal strength among NGCA BSs set in the GCNGM in step S120. As illustrated in FIG. 4, the GCNGM includes information about BSs covering an NGCA for the serving cell (SC) of the MS.

As illustrated in FIG. 3, MS11 is in a common area between BS13 and BS11, MS12 is in the service area 300 of BS13 other than the NGCA, and the group call service is available from BS11 and BS12. BS13 generates a GCNGM based on pre-stored information about BS11 and BS12 and broadcasts it to all MSs within its service area 300. Upon receipt of the GCNCM in step S110, MS11 and MS12 select a BS that offers a better service (e.g. greater received signal strength) in step S120. Under the assumption that BS11 offers a better service than BS12, MS11 and MS12 select BS11. In general, criteria by which the BS is selected in step S120 are received signal strength and reception quality, but other criteria can be used and are within the scope of the present invention.

After selecting the BS, the MS decides whether it can be connected to the BS in step S130. The decision is made based on parameters received from the BS (e.g. received signal strength). In the case illustrated in FIG. 3, MS11 and MS12 decide whether received signal strengths from BS11 is great enough to allow them to access BS11. Because MS11 is within the service area 100 of BS11, it can connect to BS11. However, MS12, out of the service area 100 of BS11, cannot connect to BS11.

Therefore, MS11 performs subsequent steps S140 to S220, while MS12 sleeps for a predetermined time to select another BS in step S135 and then returns to step S120.

Determining that it can connect to the selected BS in step S130, MS11 receives an NCH from the BS based on information included in the GCNGM in step S140. In the case illustrated in FIG. 3, MS11 receives an NCH from BS11. The NCH refers to notifications about group call paging. Therefore, all MSs receive the NCH periodically if they are to receive a particular group call service.

MS11 decides whether the NCH has been received normally in step S150. If it fails to receive the NCH, MS11 sleeps for the predetermined time to re-select a GCA BS in step S135 and returns to step S120. It can be contemplated herein that a threshold for the number of NCH reception failures from the selected BS is set and the GCA BS re-selection step is performed only when the number of the NCH reception failures exceeds the threshold. In this case, steps S140 and S150 are repeated counting the NCH reception failures until the count reaches the threshold. If the NCH reception is successful in step S150, MS11 interprets the NCH and decides whether it has been paged for a group call in step S160.

If MS11 has been paged, MS11 registers and connects to the selected BS in step S170. In the case illustrated in FIG. 3, MS11 registers and connects to BS11 to receive a group call. This operation is merely for the group call from BS11. It does not mean that registration information for a general radio communication service is transferred to BS11. Therefore, the system information is modified such that while within a location registered to BS13, MS11 can receive only group call service information from BS11, or such that the location registration information of MS11 is transferred to BS11 and thus MS11 receives both the radio communication service and the group call service from BS11.

If step S170 is successful, MS11 receives the group call from selected BS11 in step S190. That is, if MS11 successfully registers and connects to BS11 in steps S170 an S180, it receives the group call from BS11 in step S190. On the contrary, if the registration and connection fails, MS11 returns the registration information to the previous BS (e.g. BS13) and sleeps to select another BS in step S135.

Meanwhile, if MS11 has not been paged for the group call in step S160, it returns to step S140 to receive the next NCH. Here, excess NCH reception occurs. That is, with notifications on the NCH unchanged, the MS repeatedly receive the same information on the NCH unnecessarily.

To prevent the excess NCH reception, the current BS notifies MS11 whether notifications provided on the NCH from the NGCA have been changed when MS11 has not been paged for the group call in step S160 in accordance with the present invention.

This method is implemented by application of the reduced NCH monitoring mechanism in GSM 04.08 3.3.3.3 in which a GCA cell includes an NLN (Notification List Number) in its PCH to inform whether notifications provided by an NCH have been changed. That is, the current BS broadcasts a PCH with an ENLN (Expanded NLN) to notify whether notifications on an NCH from an adjacent BS have been changed. Then, MS11 receives the PCH in step S210 and decides whether the notifications on the NCH from the adjacent BS have been changed by checking the ENLN set in the PCH in step S220.

If the NCH was changed, MS11 returns to step S120 to select another BS.

As described above, in the extended group call service method of the present invention, a non-group call service-supporting BS provides MSs within its service area with information about a group call service from a group call service-supporting BS in a radio network environment supporting group call service. Therefore, even if an MS subscribed to the group call service is out of the GCA of the group call service-supporting BS, it can receive the group call service from an NGCA based on the information. That is, a group call service subscriber can receive a group out of a GCA. Especially, the subscriber can receive the group call service more effectively in a large-scale cell like an umbrella cell comprising a plurality of small cells. When the subscriber moves from one cell to another in the umbrella cell area, it can receive the group call service continuously without any further registration.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of providing a group call service in a radio network, comprising the steps of:
   (a) making a handover between a mobile station (MS) receiving the group call service and a first BS of a non-service area when the MS moves from a group call area (GCA) providing the group call service to an overlap area wherein the GCA and the non-service area overlap;
   (b) generating and broadcasting, by the first BS, extended group call service information including information on able BSs that belong to GCA neighboring the non-service area; and
   (c) selecting a second BS from the able BSs and making a handover between the MS and the second BS after the MS receives the broadcast extended group call service information.

2. The method of claim 1, further comprising:
   (d) receiving, by the MS, group call paging information from the second BS;
   (e) analyzing the group call paging information and determining if the MS can receive the group call service provided from the second BS; and
   (f) registering and connecting the MS to the second BS and receiving a group call if the MS can receive the group call service provided from the second BS.

3. The method of claim 2, wherein in step (d), the MS receives the group call paging information on a notification channel (NCH).

4. The method of claim 2, wherein in step (d), if the MS fails to receive the group call paging information from the second BS, the MS re-selects a third BS of the able BSs and receives group call paging information from the re-selected third BS.

5. The method of claim 2, wherein in step (d), if the MS fails to receive the group call paging information from the second BS, the MS repeats reception of the group call paging information from the second BS a predetermined number of times, and if the MS fails to receive for at least the predetermined number of times the group call paging information from the second BS, the MS re-selects a third BS of the able BSs and receives group call paging information from the re-selected third BS.

6. The method of claim 2, wherein in step (f), the MS changes location registration to the second BS and receives a signal for a group call and a signal for a radio communication service.

7. The method of claim 2, wherein in step (f), the MS registers only group call service information from the second BS and receives a group call from the second BS, and receives the signal for the radio communication service from the first BS.

8. The method of claim 2, further comprising the step of repeating step (e) after receiving the group call paging information from the second BS by the MS if the MS cannot receive the group call service provided from the second BS.

9. The method of claim 2, wherein, if the MS cannot receive the group call service provided from the second BS in step (e), further comprising the steps of:
   (g) analyzing by the MS, the paging information received from the first BS;
   (h) deciding whether the group call paging information has been changed by the MS, if the group call paging information of the second BS is included in the paging information; and
   (i) re-selecting, by the MS, a third BS of the able BSs if the group call paging information of the second BS has been changed and receiving group call paging information from the re-selected third BS.

10. The method of claim 1, wherein the extended group call service information includes the identifications (IDs) of the BSs (GCA BSs) covering the GCA, the frequency information corresponding to the IDs of the BSs, and the group call IDs of the BSs.

\* \* \* \* \*